United States Patent
Qi et al.

(10) Patent No.: US 8,623,954 B2
(45) Date of Patent: Jan. 7, 2014

(54) FUSER COATING COMPOSITION AND METHOD OF MANUFACTURE

(75) Inventors: Yu Qi, Ontario (CA); Qi Zhang, Mississauga (CA); David C. Irving, Avon, NY (US); Daniel L. Coughlin, Jr., Elba, NY (US); Carolyn P. Moorlag, Mississauga (CA); Brynn Mary Dooley, Toronto (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/288,494

(22) Filed: Nov. 3, 2011

(65) Prior Publication Data
US 2013/0116369 A1 May 9, 2013

(51) Int. Cl.
*C08K 3/34* (2006.01)

(52) U.S. Cl.
USPC ........... 524/492; 523/307; 523/309; 524/430; 524/493

(58) Field of Classification Search
USPC ................ 523/307, 309; 524/430, 492, 493
See application file for complete search history.

(56) References Cited

U.S. PATENT DOCUMENTS

| | | | |
|---|---|---|---|
| 4,451,634 A | 5/1984 | Hatanaka et al. | |
| 4,711,818 A | 12/1987 | Henry | |
| 5,363,180 A | 11/1994 | Shimizu et al. | |
| 5,666,592 A | 9/1997 | Aslam et al. | |
| 5,709,973 A | 1/1998 | Chen et al. | |
| 5,716,750 A | 2/1998 | Tyagi et al. | |
| 5,729,813 A | 3/1998 | Eddy et al. | |
| 5,887,235 A | 3/1999 | Wayman et al. | |
| 6,087,729 A | 7/2000 | Cerofolini et al. | |
| 6,101,345 A | 8/2000 | Van Goethem et al. | |
| 6,113,830 A | 9/2000 | Chen et al. | |
| 6,438,336 B1 | 8/2002 | Bengtson | |
| 6,927,006 B2 | 8/2005 | Finn et al. | |
| 6,983,119 B2 | 1/2006 | Nakayama | |
| 7,088,946 B2 | 8/2006 | Behnke et al. | |
| 7,395,021 B2 | 7/2008 | Tamura et al. | |
| 7,754,121 B2 | 7/2010 | Ristic-Lehmann et al. | |
| 8,029,871 B2 | 10/2011 | Nakayama et al. | |
| 8,135,324 B2 | 3/2012 | Moorlag | |
| 2001/0034158 A1 | 10/2001 | Matsubara | |
| 2003/0207078 A1 | 11/2003 | Finn et al. | |
| 2004/0034158 A1 | 2/2004 | Reuter et al. | |
| 2005/0100728 A1 | 5/2005 | Ristic-Lehmann et al. | |
| 2007/0231615 A1 | 10/2007 | Tsujimoto et al. | |
| 2008/0070041 A1 | 3/2008 | Kuntz et al. | |
| 2008/0241415 A1 | 10/2008 | Stelter et al. | |
| 2008/0311398 A1 | 12/2008 | Bauer et al. | |
| 2009/0247648 A1 | 10/2009 | Zhao | |
| 2010/0226701 A1 | 9/2010 | Moorlag | |
| 2012/0244469 A1 | 9/2012 | Zwartz et al. | |

OTHER PUBLICATIONS

Buie-Hatcher, Final Office Action, U.S. Appl. No. 13/053,418, filed Sep. 19, 2012.
U.S. Appl. No. 13/251,364, filed Oct. 3, 2011.
U.S. Appl. No. 13/182,015, filed Jul. 13, 2011.
U.S. Appl. No. 13/053,730, filed Mar. 22, 2011.
U.S. Appl. No. 13/053,423, filed Mar. 22, 2011.
U.S. Appl. No. 13/053,418, filed Mar. 22, 2011.
U.S. Appl. No. 13/053,423, Office Action dated Feb. 22, 2013.
U.S. Appl. No. 13/053,418, Notice of Allowance and Fees Due dated Dec. 28, 2012.
U.S. Appl. No. 13/053,418, filed Mar. 22, 2011, Office Action dated Apr. 17, 2012.
"DOW Corning VM-2270 Aerogel Fine Particles" Dow Corning Corporation 2008.
U.S. Appl. No. 13/251,364, Office Action dated Apr. 11, 2013.
U.S. Appl. No. 13/448,822, Office Action dated Jun. 7, 2013.
Roberts, "Resonant Acoustic Mixing", Resodyn Acoustic Mixers, Nov. 6, 2011, pp. 1-8.
"Spectral Series Fumed Alumina for Power Coating Processes", Cabot Corporation, MA, USA, 2005, pp. 1-2.
U.S. Appl. No. 13/053,423, Office Action dated Jun. 17, 2013.

*Primary Examiner* — Edward Cain

(74) *Attorney, Agent, or Firm* — Hoffman Warnick LLC

(57) ABSTRACT

The present teachings include a coating composition of a powder of fluorine containing particles, aerogel particles and poly(alkylene carbonate). A method of making a fuser member and the fuser member resulting therefrom is also provided.

11 Claims, 4 Drawing Sheets

FUSER COATING COMPOSITION AND METHOD OF MANUFACTURE

BACKGROUND

1. Field of Use

This disclosure is generally directed to fuser members useful in electrophotographic imaging apparatuses, including digital, image on image, and the like. This disclosure also relates to processes for making and using fuser members.

2. Background

In a typical electrophotographic imaging apparatus, an image of an original to be copied, or the electronic document image, is recorded in the form of an electrostatic latent image upon a photosensitive member and the latent image is subsequently rendered visible by the application of thermoplastic resin particles or composites thereof which are commonly referred to as toner. The visible toner image is in a loose powdered form and can be easily disturbed or destroyed. The toner image is usually fixed or fused upon a substrate or support member which may be a cut sheet or continuous media, such as plain paper.

Gloss is a property of a surface that relates to specular reflection. Specular reflection is a sharply defined light beam resulting from reflection off a smooth, uniform surface. Gloss follows the law of reflection which states that when a ray of light reflects off a surface, the angle of incidence is equal to the angle of reflection. Gloss properties are generally measured in gardner gloss units (ggu) by a gloss meter.

Currently, there is a need to provide low gloss prints; however, manufacturing fuser topcoats to provide low gloss prints is difficult. It would be desirable to provide a method of manufacturing fuser members having a topcoat or release layer that produces low gloss prints.

SUMMARY

According to various embodiments, there is provided a coating composition comprising a powder of fluorine containing particles, aerogel particles and poly(alkylene carbonate).

An alternate embodiment includes a method of making a fuser member. The method comprises obtaining a fuser member comprising a resilient layer disposed on a substrate. A powder coating composition of fluorine containing particles, aerogel particles and poly(alkylene carbonate) is deposited on the resilient layer to form a coated layer. The coated layer is heated to a temperature of from about 300° C. to about 380° C. to form a release layer.

A further aspect described herein is a fuser member. The fuser member comprises a substrate and an outer layer disposed on the substrate, wherein the outer layer comprises a fluoroplastic matrix having dispersed therein aerogel particles, wherein the aerogel particles comprise from about 1 weight percent to about 2.5 weight percent and a fluorinated surfactant and wherein a surface energy of the outer layer is less than about 20 mN/m².

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
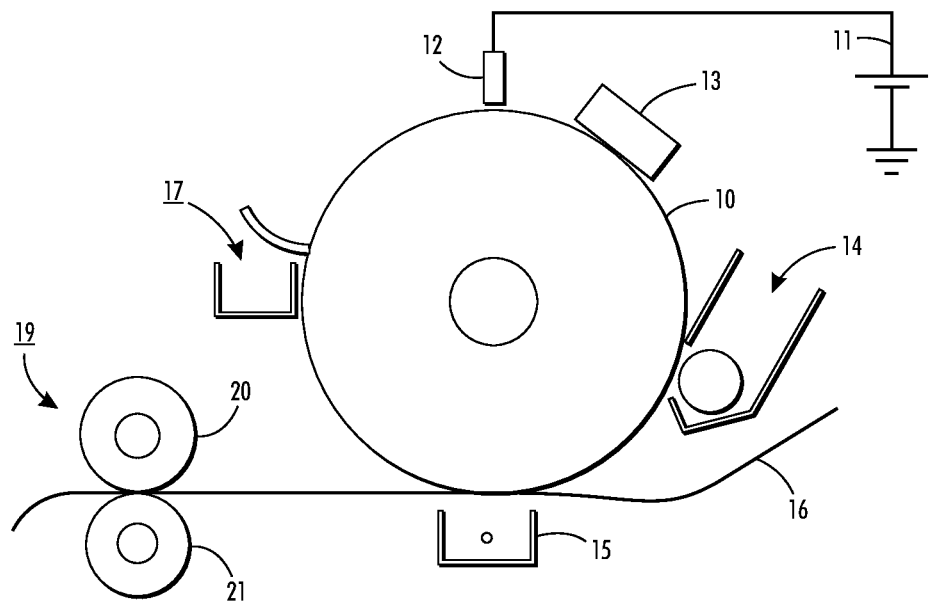
FIG. 1 is a schematic illustration of an image apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, a photoreceptor 10 is charged on its surface by means of a charger 12 to which a voltage has been supplied from a power supply 11. The photoreceptor 10 is then imagewise exposed to light from an optical system or an image input apparatus 13, such as a laser and light emitting diode, to form an electrostatic latent image thereon. Generally, the electrostatic latent image is developed by bringing a developer mixture from a developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image, forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface in image configuration, they are transferred to a copy sheet 16 by a transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to a fusing station 19, depicted in FIG. 1 as a fuser roll 20 and a pressure roll 21 (although any other fusing components such as a fuser belt in contact with a pressure roll, fuser roll in contact with pressure belt, and the like, are suitable for use with the present apparatus), wherein the developed image is fused to copy sheet 16 by passing copy sheet 16 between the fusing and pressure rolls, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
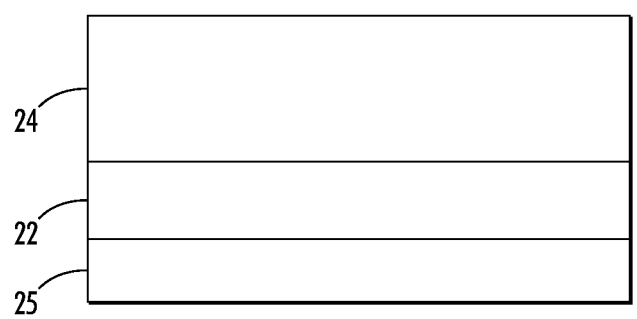
FIG. 2 is a schematic of an embodiment of a fuser member.

FIG. 2 is an enlarged schematic view of an embodiment of a fuser member, demonstrating the various possible layers. The fuser member can be a roller or a belt. As shown in FIG. 2, a substrate 25 has a resilient or intermediate layer 22 thereon. On intermediate layer 22 is a release layer 24 or surface layer.

Substrate

Examples of suitable substrate 25 materials include, in the case of a roller configuration, metals such as aluminum, stainless steel, steel, nickel and the like. In embodiments having a belt configuration, the substrate material can include polymers such as polyimides, polyamideimides, polyetherimides, polyether ether ketones and polyphenylene sulfides.

Resilient or Intermediate Layer

Examples of materials used for the intermediate layer 22 (also referred to as cushioning layer or resilient layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as intermediate layer 22 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B® VITON E® VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR, FOR-LHF® NM® FOR-THF®, FOR-TFS® TH® NH®, P757®, TNS®, T439®, PL958®, BR9151® and TN505, available from Solvay Solexis.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the intermediate layer 22 is from about 30 microns to about 10 millimeters, or from about 100 microns to about 800 microns, or from about 150 microns to about 500 microns.

Release Layer

An exemplary embodiment of a release layer 24 is described in more detail below. For oil-less fusing the release layer includes fluoroplastic polymers. The fluoroplastic polymers have a melting temperature of from about 300° C. to about 380° C. or from about 330° C. to about 370° C. or from about 340° C. to about 360° C. The fluoroplastic polymers are selected from the group consisting of polytetrafluoroethylene (PTFE); perfluoroalkoxy polymer resin (PFA); copolymers of tetrafluoroethylene and hexafluoropropylene; copolymers of hexafluoropropylene and vinylidene fluoride; terpolymers of tetrafluoroethylene, vinylidene fluoride, and hexafluoropropylene; and tetrapolymers of tetrafluoroethylene, vinylidene fluoride, and hexafluoropropylene, and mixtures thereof For the fuser member, the thickness of the outer surface layer or release layer 24 can be from about 5 microns to about 250 microns, or from about 20 microns to about 80 microns, or from about 30 microns to about 60 microns. The release layer 24 or surface layer has an electrical surface resistivity ranging from about $10^3$ to about $10^8$ Ω/sq, or from about $5 \times 10^3$ to about $1.5 \times 10^6$ Ω/sq, or from about $8 \times 10^3$ to about $1.5 \times 10^4$ Ω/sq.

Adhesive Layer(s)

Optionally, any known and available suitable adhesive layer, also referred to as a primer layer may be positioned between the release layer 24, the functional intermediate layer 22 and the substrate 25. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 0.1 micrometer to about 10 micrometers, or from about 1 micrometers to about 6 micrometers. The adhesive can be coated by any suitable known technique, including spray coating or wiping.

Fluorine containing particles have been used as the topcoat materials for oil-less fusing for their good releasing property. The fluorine containing polymers are selected from the group consisting of polytetrafluoroethylene (PTFE); perfluoroalkoxy polymer resin (PFA); copolymers of tetrafluoroethylene and hexafluoropropylene; copolymers of hexafluoropropylene and vinylidene fluoride; terpolymers of tetrafluoroethylene, vinylidene fluoride, and hexafluoropropylene; and tetrapolymers of tetrafluoroethylene, vinylidene fluoride, and hexafluoropropylene and a cure site monomer, and mixtures thereof. PFA and PTFE, the most representative fluoroplastics for fusing applications, are chemically and thermally stable and possess a low surface energy. However, these materials are also highly crystalline and therefore difficult to process. High temperature sintering (>300° C.) is the only way to make them into a continuous film.

It has been demonstrated that low gloss prints can be produced by a matte fuser roll in oil-less fusing systems (i.e. DC700). The matte fuser roll contains a topcoat made from fluoroplastic filled with hydrophobic silica aerogel (VM2270 aerogel powder, Dow Corning). The fuser roll gloss decreases with increasing Aerogel loading. The print gloss correlates well with the roll gloss. Low gloss topcoats were prepared by spray-coating a dispersion of Aerogel/PFA in isopropyl alchohol (IPA) followed by high-temperature curing. However, the manufacturing reliability of spray coating is problematic.

For a powder coating to produce a reliably uniform layer the coating must be homogenous. Although aerogel and PFA particles can be uniformly blended using a Henschel blender, the homogeneity of the blend cannot be maintained during the powder coating process. As a result, aerogel particles are not present in the powder-coated aerogel/PFA topcoat using a blended aerogel/PFA mixture. It is theorized that the lack of interaction between aerogel and PFA results in their separation during the powder coating process. In addition, the aerogel/PFA topcoat contains many voids, which is possibly caused by poor wetting between aerogel and PFA. Therefore, it is critical to develop a method to attach aerogel to PFA particles aimed at maintaining the homogeneity of the two particles during the powder coating process.

Disclosed herein is a fabrication method, composition and system for aerogel/fluorine containing polymer fuser topcoats using a powder coating technique. The powder composition comprises fluorine containing particles, aerogel particles and a surfactant or wetting agent. In addition, a binder is used to bond the aerogel particles with the fluorine containing particles. Specifically, the binder is a transient binder which decomposes before fluorine containing particles melt to form a continuous film, hence the transient binder has no impact on the performance of the final topcoat. The aerogel loading is from about 0.1 weight percent to about 5.0 weight percent, or from about 0.5 weight percent to about 4.0 weight percent or from about 1.0 weight percent to about 3.0 weight percent based on the total weight of the fluorine-containing particles.

The transient binder used in this invention is poly(alkylene carbonate) (PAC), which essentially decomposes at 250° C. Examples of suitable poly(alkylene carbonates) used herein include poly(propylene carbonate), poly(ethylene carbonate), poly(butylene carbonate), poly(cyclohexene carbonate) and mixtures thereof.

To improve the wettability between aerogel and fluoroplastic particles, a fluorinated surfactant GF300 or 400 (commercially available from Toagosei) is added as a wetting agent. GF-300 and GF-400 are methacrylate-based fluorosurfactant referred to as fluorinated graft copolymers. Others fluorinated surfactants include GF-150 from Toagosei Chemical Industries; MODIPER F-600 from Nippon Oil & Fats Company; SURFLON S-381 and S-382 from Asahi Glass Company; FC-430, FC-4430, FC-4432 and FC-129 from 3M. The amount in the powder is from about 0.1 weight percent to about 5 weight percent, or from about 0.5 weight percent to about 3.0 weight percent, or from about 1.0 weight percent to about 2.0 weight percent based on the total weight of the fluorine-containing particles.

The dry aerogel/fluorine containing particles composite powder is obtained by mixing both aerogel and fluorine containing particles with a a solvent such as methylethylketone (MEK) solution containing GF400 and poly(alkylene carbonate), followed by removing the solvent by evaporation and drying under vacuum. Other suitable solvents include acetone, cyclohexanone, methylene chloride, ethyl acetate, methoxy methylether, butyl acetate, acetonitrile, dimethylformamide, N-methyl-2-pyrrolidone, dimethyl sulfoxide and mixtures thereof. Using the powder prepared as such, the powder-coated aerogel/fluorine containing polymer topcoat has a uniform, textured surface. The roll fusing-tested in DC700 generates uniform print gloss which is lower than that of the control.

Generally, the fluorinated surfactant is present in an amount of from about 0.01 to about 3.0 weight percent, based on the weight of the powder coating composition. In other embodiments, the surfactant is present in an amount of from about 0.08 to about 1.0 weight percent. In specific embodiments, the surfactant is present in an amount of from about 0.1 to about 0.3 weight percent. The dry aerogel/fluorine containing powder was obtained by mixing both aerogel and fluorine containing particles with poly (alkylene carbonate) (PAC) and GF400 in a solvent, followed by removing the solvent by evaporation and drying under vacuum. The formulation was optimized by controlling the binder content to achieve the optimum binding effect. The powder-coated aerogel/fluorine containing polymer topcoat was heated above 300° C. to melt the fluorine containing particles. A to form a continuous film. As the transient binder is completely decomposed before fluorine-containing polymer melts and is removed from the fluorine containing layer, the topcoat maintains all properties that fluorine containing polymer, i.e. good release properties and robustness. The print gloss is tunable by controlling the loading of the silica aerogel particles.

The advantages of the embodiments described herein include, but are not limited to, providing homogeneously mixed aerogel and fluorine containing particles throughout the powder coating process as the fluorine containing particles and the aerogel particles are attached to each other. The transient binder completely decomposes at a temperature below the melting point of the fluorine containing polymer so the binder has no impact on the performance of the final composite coating. A wetting agent added to improve wetting between aerogel and fluorine containing polymer provides improved coating quality.

Poly(alkylene carbonate) decomposes at about 250° C. to water and $CO_2$. The amount of poly(alkylene carbonate) in the topcoat powder coating ranges from about 1 weight percent to about 30 weight percent, or from about 2 weight percent to about 15 weight percent, or from about 3 weight percent to about 10 weight percent.

The aerogel/fluorine containing polymer topcoat is fabricated by coating the coating composition on a silicone-molded roll to form a coated layer, followed by heating at a temperature that the poly(alkylene carbonate) decomposes and then at a temperature above the melting temperature of the fluoropolymer to form the coated layer. The fluorine containing polymers have a melting temperature of from about 320° C. to about 380° C. or from about 330° C. to about 370° C. or from about 340° C. to about 360° C.

Examples of fluoroplastics include polytetrafluoroethylene (PTFE, e.g., sold by DuPont under the tradename Teflon), perfluoroalkoxy polymer resin (PFA, e.g., sold by DuPont under the tradename Teflon), fluorinated ethylene-propylene, (FEP, e.g., sold by DuPont under the tradename Teflon), polyethylenetetrafluoroethylene(ETFE, e.g., sold by DuPont under the registered tradename Tefzel, or sold by Asahi Glass company under the registered tradename Fluon), polyvinylfluoride (PVF, e.g., sold by DuPont under the registered tradename Tedlar), polyethylenechlorotrifluoroethylene (ECTFE, e.g., sold by Solvay Solexis under the registered tradename Halar), or polyvinylidene fluoride (PVDF, e.g., sold by Arkema under the registered tradename of Kynar).

Aerogel/fluorine containing polymer composite coatings produce a superhydrophobic surface capable of very low surface energy. The addition of aerogel to a fluorine containing coating increases the modulus, and allows the opportunity to modify the materials' properties without increasing the surface energy (such as would be the case with the addition of carbon black or other hard filler particles). The surface energy of the finalt coating is from about 10 mN/m$^2$ to about 25 mN/m$^2$, or from about 12 mN/m$^2$ to about 20 mN/m$^2$ or from about 15 mN/m$^2$ to about 18 mN/m$^2$.

Aerogels may be described, in general terms, as gels that have been dried to a solid phase by removing pore fluid and replacing the pore fluid with air. As used herein, an "aerogel" refers to a material that is generally a very low density ceramic solid, typically formed from a gel. The term "aerogel" is thus used to indicate gels that have been dried so that the gel shrinks little during drying, preserving its porosity and related characteristics. In contrast, "hydrogel" is used to describe wet gels in which pore fluids are aqueous fluids. The term "pore fluid" describes fluid contained within pore structures during formation of the pore element(s). Upon drying, such as by supercritical drying, aerogel particles are formed that contain a significant amount of air, resulting in a low density solid and a high surface area. In various embodiments, aerogels are thus low-density microcellular materials characterized by low mass densities, large specific surface areas and very high porosities. In particular, aerogels are characterized by their unique structures that comprise a large number of small inter-connected pores. After the solvent is removed, the polymerized material is pyrolyzed in an inert atmosphere to form the aerogel.

Any suitable aerogel component can be used. In embodiments, the aerogel component can be, for example, selected from inorganic aerogels, organic aerogels, carbon aerogels, and mixtures thereof. In particular embodiments, ceramic aerogels can be suitably used. These aerogels are typically composed of silica, but may also be composed of metal oxides, such as alumina, titania and zirconia, or carbon, and can optionally be doped with other elements such as a metal. In some embodiments, the aerogel component can comprise aerogels chosen from polymeric aerogels, colloidal aerogels, and mixtures thereof.

The aerogel component can be either formed initially as the desired sized particles, or can be formed as larger particles and then reduced in size to the desired size. For example, formed aerogel materials can be ground, or they can be directly formed as nano to micron sized aerogel particles.

Aerogel particles of embodiments may have porosities of from about 50 percent to about 99.9 percent, in which the aerogel can contain 99.9 percent empty space. In embodiments the aerogel particles have porosities of from about 50 percent to about 99.0 percent, or from 50 percent to about 98 percent. In embodiments, the pores of aerogel components may have diameters of from about 2 nm to about 500 nm, or from about 10 nm to about 400 nm or from about 20 nm to about 100 nm. In particular embodiments, aerogel components may have porosities of more than 50% pores with diameters of less than 100 nm and even less than about 20 nm. In embodiments, the aerogel components may be in the form of particles having a shape that is spherical, or near-spherical, cylindrical, rod-like, bead-like, cubic, platelet-like, and the like.

In embodiments, the aerogel components include aerogel particles or powders, ranging in average volume particle size of from about 1 μm to about 100 μm, or about 3 μm to about 50 μm, or about 5 μm to 20 μm. The aerogel components can include aerogel particles that appear as well dispersed single particles or as agglomerates of more than one particle or groups of particles within the polymer material.

The continuous and monolithic structure of interconnecting pores that characterizes aerogel components also leads to high surface areas and, depending upon the material used to make the aerogel, the electrical conductivity may range from highly thermally and electrically conducting to highly thermally and electrically insulating. Further, aerogel components in embodiments may have surface areas ranging from about 400 m$^2$/g to about 1200 m$^2$/g, such as from about 500 m$^2$/g to about 1200 m$^2$/g, or from about 700 m$^2$/g to about 900 m$^2$/g. In embodiments, aerogel components may have electrical resistivities greater than about $1.0 \times 10^{-4}$ Ω-cm, such as in a range of from about 0.01 Ω-cm to about $1.0 \times 10^{16}$ Ω-cm, from about 1 Ω-cm to about $1.0 \times 10^8$ Ω-cm, or from about 50 Ω-cm to about 750,000 Ω-cm. Different types of aerogels used in various embodiments may also have electrical resistivities that span from conductive, about 0.01 Ω-cm to about 1.00 Ω-cm, to insulating, more than about $10^{16}$ Ω-cm. Conductive aerogels of embodiments, such as carbon aerogels, may be combined with other conductive fillers to produce combinations of physical, mechanical, and electrical properties that are otherwise difficult to obtain.

Aerogels that can suitably be used in embodiments may be divided into three major categories: inorganic aerogels, organic aerogels and carbon aerogels. In embodiments, the fuser member layer may contain one or more aerogels chosen from inorganic aerogels, organic aerogels, carbon aerogels and mixtures thereof. For example, embodiments can include multiple aerogels of the same type, such as combinations of two or more inorganic aerogels, combinations of two or more organic aerogels, or combinations of two or more carbon aerogels, or can include multiple aerogels of different types, such as one or more inorganic aerogels, one or more organic aerogels, and/or one or more carbon aerogels. For example, a chemically modified, hydrophobic silica aerogel may be combined with a high electrical conductivity carbon aerogel to simultaneously modify the hydrophobic and electrical properties of a composite and achieve a desired target level of each property.

Inorganic aerogels, such as silica aerogels, are generally formed by sol-gel polycondensation of metal oxides to form highly cross-linked, transparent hydrogels. These hydrogels are subjected to supercritical drying to form inorganic aerogels.

Organic aerogels are generally formed by sol-gel polycondensation of resorcinol and formaldehyde. These hydrogels are subjected to supercritical drying to form organic aerogels.

Carbon aerogels are generally formed by pyrolyzing organic aerogels in an inert atmosphere. Carbon aerogels are composed of covalently bonded, nanometer-sized particles that are arranged in a three-dimensional network. Carbon aerogels, unlike high surface area carbon powders, have oxygen-free surfaces, which can be chemically modified to increase their compatibility with polymer matrices. In addition, carbon aerogels are generally electrically conductive, having electrical resistivities of from about 0.005 Ω-cm to about 1.00 Ω-cm. In particular embodiments, the composite may contain one or more carbon aerogels and/or blends of one or more carbon aerogels with one or more inorganic and/or organic aerogels.

Carbon aerogels that may be included in embodiments exhibit two morphological types, polymeric and colloidal, which have distinct characteristics. The morphological type of a carbon aerogel depends on the details of the aerogel's preparation, but both types result from the kinetic aggregation of molecular clusters. That is, nanopores, primary particles of carbon aerogels that may be less than 20 Å (Angstroms) in size and that are composed of intertwined nanocrystalline graphitic ribbons, cluster to form secondary particles, or mesopores, which may be from about 20 Å to about 500 Å. These mesopores can form chains to create a porous carbon aerogel matrix. The carbon aerogel matrix may be dispersed, in embodiments, into polymeric matrices by, for example, suitable melt blending or solvent mixing techniques.

In embodiments, carbon aerogels may be combined with, coated, or doped with a metal to improve conductivity, magnetic susceptibility, and/or dispersibility. Metal-doped carbon aerogels may be used in embodiments alone or in blends with other carbon aerogels and/or inorganic or organic aerogels. Any suitable metal, or mixture of metals, metal oxides and alloys may be included in embodiments in which metal-doped carbon aerogels are used. In particular embodiments, and in specific embodiments, the carbon aerogels may be doped with one or more metals chosen from transition metals (as defined by the Periodic Table of the Elements) and aluminum, zinc, gallium, germanium, cadmium, indium, tin, mercury, thallium and lead. In particular embodiments, carbon aerogels are doped with copper, nickel, tin, lead, silver, gold, zinc, iron, chromium, manganese, tungsten, aluminum, platinum, palladium, and/or ruthenium. For example, in embodiments, copper-doped carbon aerogels, ruthenium-doped carbon aerogels and mixtures thereof may be included in the composite.

For example as noted earlier, in embodiments in which the aerogel components comprise nanometer-scale particles, these particles or portions thereof can occupy inter- and intra-molecular spaces within the molecular lattice structure of the polymer, and thus can prevent water molecules from becoming incorporated into those molecular-scale spaces. Such blocking may decrease the hydrophilicity of the overall composite. In addition, many aerogels are hydrophobic. Incorporation of hydrophobic aerogel components may also decrease the hydrophilicity of the composites of embodiments. Composites having decreased hydrophilicity, and any components formed from such composites, have improved environmental stability, particularly under conditions of cycling between low and high humidity.

The aerogel particles can include surface functionalities selected from the group of alkylsilane, alkylchlorosilane, alkylsiloxane, polydimethylsiloxane, aminosilane and methacrylsilane. In embodiments, the surface treatment material contains functionality reactive to aerogel that will result in modified surface interactions. Surface treatment also helps enable non-stick interaction on the composition surface.

In addition, the porous aerogel particles may interpenetrate or intertwine with the fluorine containing polymer and thereby strengthen the polymeric lattice. The mechanical properties of the overall composite of embodiments in which aerogel particles have interpenetrated or interspersed with the polymeric lattice may thus be enhanced and stabilized.

For example, in one embodiment, the aerogel component can be a silica silicate having an average particle size of 5-15 microns, a porosity of 90% or more, a bulk density of 40-100 kg/m$^3$, and a surface area of 600-800 m$^2$/g. Of course, materials having one or more properties outside of these ranges can be used, as desired.

Depending upon the properties of the aerogel components, the aerogel components can be used as is, or they can be chemically modified. For example, aerogel surface chemistries may be modified for various applications, for example, the aerogel surface may be modified by chemical substitution upon or within the molecular structure of the aerogel to have hydrophilic or hydrophobic properties. For example, chemical modification may be desired so as to improve the hydrophobicity of the aerogel components. When such chemical treatment is desired, any conventional chemical treatment well known in the art can be used. For example, such chemical treatments of aerogel powders can include replacing surface hydroxyl groups with organic or partially fluorinated organic groups, or the like.

In general, a wide range of aerogel components are known in the art and have been applied in a variety of uses. For example, many aerogel components, including ground hydrophobic aerogel particles, have been used as low cost additives in such formulations as hair, skincare, and antiperspirant compositions. One specific non-limiting example is the commercially available powder that has already been chemically treated, Dow Corning VM-2270 Aerogel fine particles having a size of about 5-15 microns.

Any suitable amount of the aerogel may be incorporated into the powder coating, to provide desired results. For example, the coating layer may be formed from about 0.1 weight percent to about 25 weight percent aerogel of the total weight of the surface coating, or from about 0.5 weight percent to about 15 weight percent aerogel of the total weight of the surface coating or from about 1 weight percent to about 10 weight percent of the total weight of the surface coating. The size of aerogel particles is from about 1 μm to about 100 μm, or about 3 μm to about 50 μm, or about 5 μm to 20 μm.

The surface coating has a surface free energy that is less than the surface energy of a fluorine containing polymer base layer that is used in the composite. This depends on the fluorine containing polymer. In embodiments fluorine containing polymers with aerogel particles dispersed therein produce a surface layer having a surface energy of less than 20 mN/m$^2$. In embodiments the surface free energy is less than 10 mN/m$^2$ for a superhydrophobic surface, or between 10 mN/m$^2$ and 2 mN/m$^2$, or is between 10 mN/m$^2$ and 5 mN/m$^2$, or is between 10 mN/m$^2$ and 7 mN/m$^2$.

The poly(alkylene carbonate) sacrificial material is commercially available, from, e.g. Empower Materials. The poly (alkylene carbonate) has a molecular weight in the range of 10,000 to 800,000, or in the range of 50,000 to 600,000, or in the range of 100,000 to 500,000. The molecular weight is a weight average molecular weight (Mw). The poly(alkylene carbonate) is a copolymer derived from carbon dioxide and produced through the copolymerization of $CO_2$ with one or more epoxides, which decomposes from about 200° C. to about 340° C., or from about 210° C. to about 330° C., or from about 220° C. to about 300° C. As the decomposition is uniform and controlled, the probability of cracks and defects in the final coating is reduced.

Additives and additional fillers may be present in the above-described powder coating composition or the other described layers of the fuser member. In various embodiments, other filler materials or additives including, for example, inorganic particles, can be used for the coating composition and the subsequently formed release layer. Conductive fillers used herein include carbon blacks such as carbon black, graphite, fullerene, acetylene black, fluorinated carbon black, and the like; carbon nanotubes, metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), polypyrroles, polyindole, polypyrene, polycarbazole, polyazulene, polyazepine, poly(fluorine), polynaphthalene, salts of organic sulfonic acid, ammonium or phosphonium salts and mixture thereof can be used as fillers. In various embodiments, other additives known to one of ordinary skill in the art can also be included to form the disclosed composite materials. The fillers are present in an amount of from about 0.1 weight percent to about 50 weight percent, or from about 0.5 weight percent to about 30 weight percent, from about 1 weight percent to about 10 weight percent of the coating composition.

The powder composition is electrostatically spray coated, electrostatic fluidized bed coated, electrostatic magnetic brush coated, or fluidized bed coated on a substrate in any suitable known manner.

After coating the composition is heated to a first temperature for a time sufficient to decompose the poly(alkylene carbonate) to form the coated layer. The heating step is at a temperature of from about 300° C. to about 380° C. or from about 320° C. to about 370° C., or from about 330° C. to about 360° C., for a time of from about 15 minutes to about 60 minutes, or a time of from about 20 minutes to about 50 minutes, or a time of from about 25 minutes to about 45 minutes. The poly(alkylene carbonate) decomposes and the fluorine containing melts to form a continuous layer. The amount of poly(alkylene carbonate) is from about 1 weight percent to about 30 weight percent, or from about 2 weight percent to about 15 weight percent, or from about 3 weight percent to about 10 weight percent based on the total solids in the composition.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Preparation of an Aerogel/PFA Powder Composition Containing 1% Ailica Aerogel (I):

A dispersion of aerogel particles (5 g) in a methyl ethyl ketone (MEK) solution containing 0.2 g of poly(propylene carbonate) (QPAC® 40, Empower), 0.02 g of GF400, and 100 g of MEK was dropped into 500 g of PFA powder while stirring with a mechanical stirrer. The addition was completed within 30 min. The mixture was continuously stirred for 60 min. The resulting powder was dried at 44° C. for 48 hours. The dry powder was used for powder coating.

Preparation of an Aerogel/PFA Powder Composition Containing 2.5% Silica Aerogel (II):

The dry powder was prepared in the same procedure as that for the 1% Aerogel/PFA powder. The amount of aerogel, GF400, MEK, and PFA was 12.5 g, 0.1 g, 200 g, and 500 g, respectively.

Figure 3A:
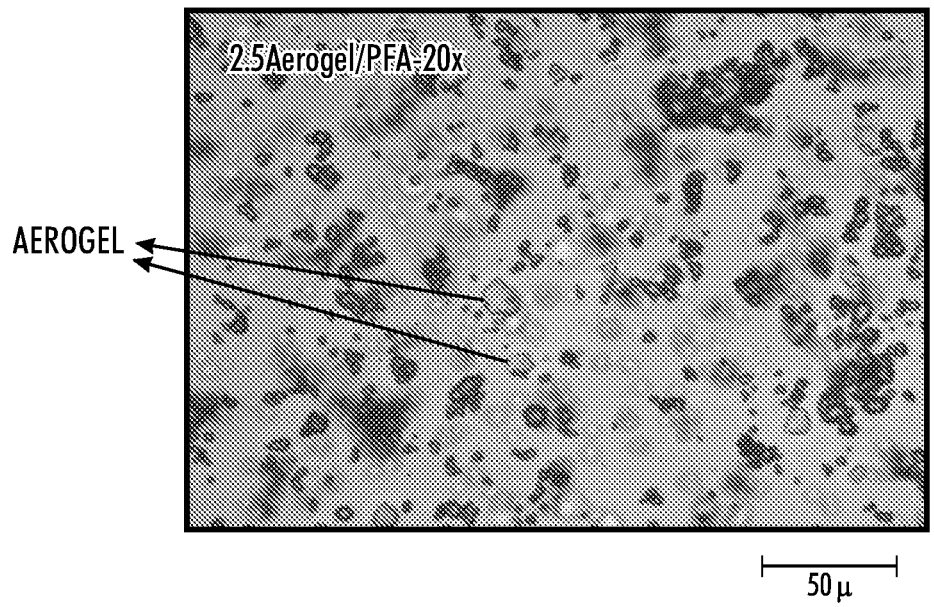
FIG. 3(a) shows an optical microscopic image of a powder coating of aerogel particles and PFA particles.
Figure 3B:
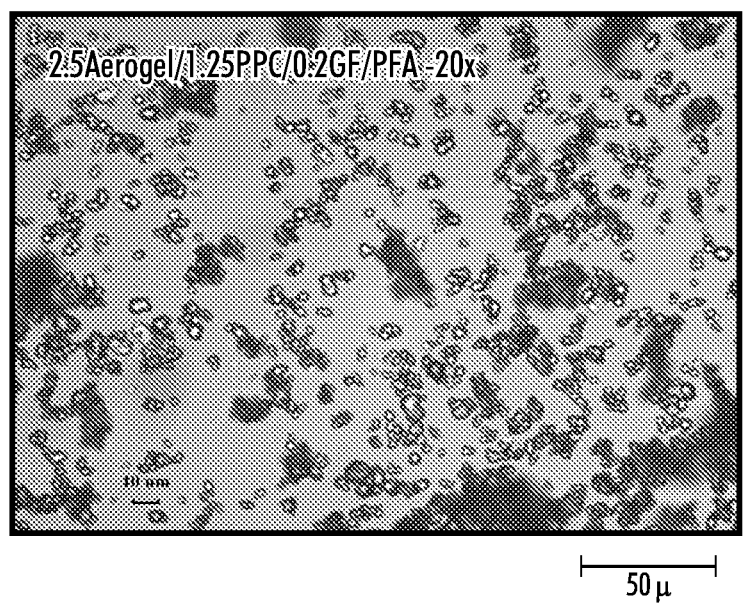
FIG. 3(b) shows an optical microscopic image of a powder coating of aerogel particles, PFA particles and polypropylene carbonate and surfactant GF 400.

The individual Aerogel particles were loosely distributed in the optical microscopic image of the powder mixture without the binder poly propyl carbonate (PPC) (FIG. 3(a)). With the PPC, Aerogel particles nearly completely bind to PFA particles by the PPC binder (FIG. 3(b)). Thus, the addition of PPC and GF 400 to the mixture provides a powder coating that remain well mixed throughout.

Figure 4A:
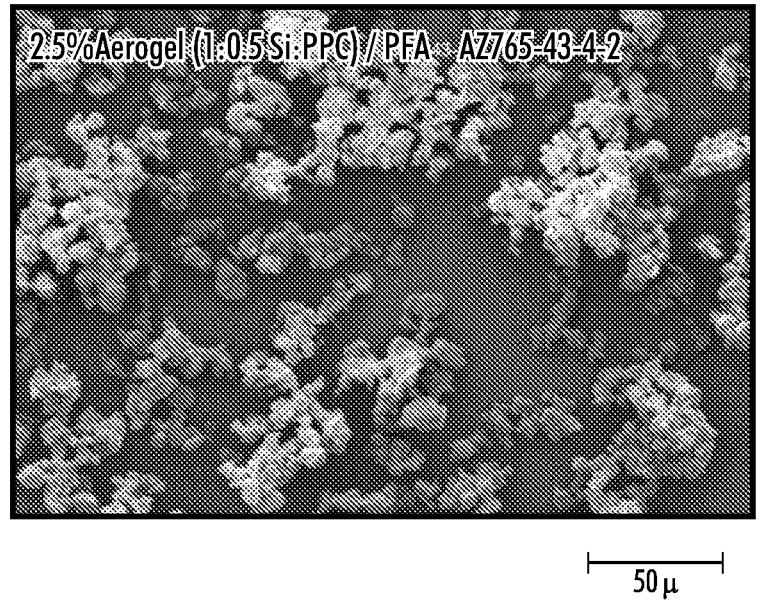
FIG. 4(a) shows an SEM image of a powder coating of 2.5 weight percent aerogel particles, PFA particles and polypropylene carbonate.
Figure 4B:
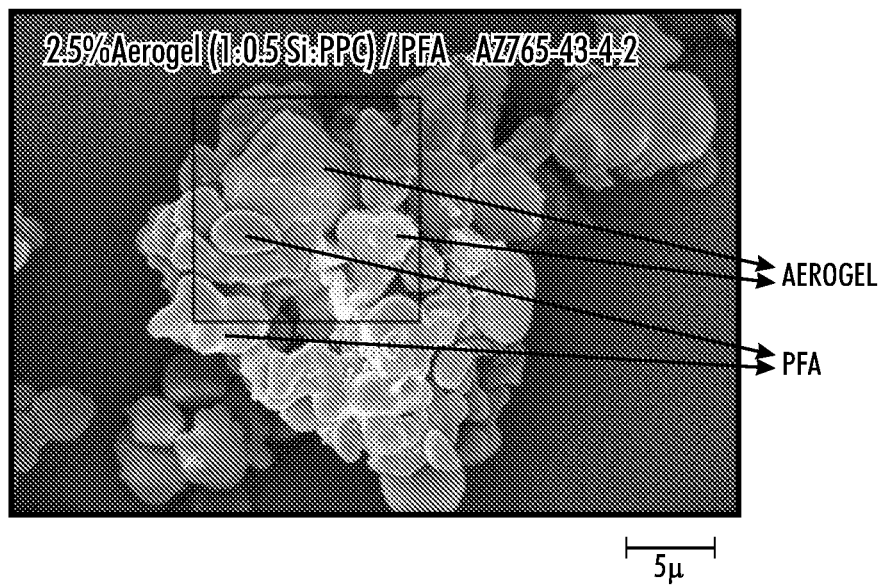
FIG. 4(b) shows an SEM image of a powder coating of 2.5 weight percent aerogel particles, PFA particles and polypropylene carbonate.

The powder mixture shows the aerogel particles with rough surface and granular shape are bonded together with the spherical and smooth PFA particles by PPC in FIGS. 4(a) and 4(b). FIG. 4(b) is at a higher magnification and shows that aerogel and PFA particles bonded together. During the spray coating operation, there is no settling of aerogel particles and a homogenous coating can be produced.

Fuser rolls were produced by wet spraying a primer or adhesive layer (DuPont PL-990CL) approximately 3 μm to 5 μm thick to a fuser roll having a silicone coating. An electrostatic powder coating layer of the powder coating shown in FIGS. 4(a) and 4(b) was applied to the primer layer to form the aerogel/PFA powder coated topcoat. The layer thickness of the topcoat was about 25 μm to about 35 μm. The fuser rolls were then rapidly heated (about 10-15 minutes) from room temperature in a convection oven to a final cure temperature of 330° C. and held stable for 20 minutes to form a continuous film. The oven was then opened to cool the roll to about 235° C. (in about 5 minutes) prior to removal to a room temperature environment.

Figure 5A:
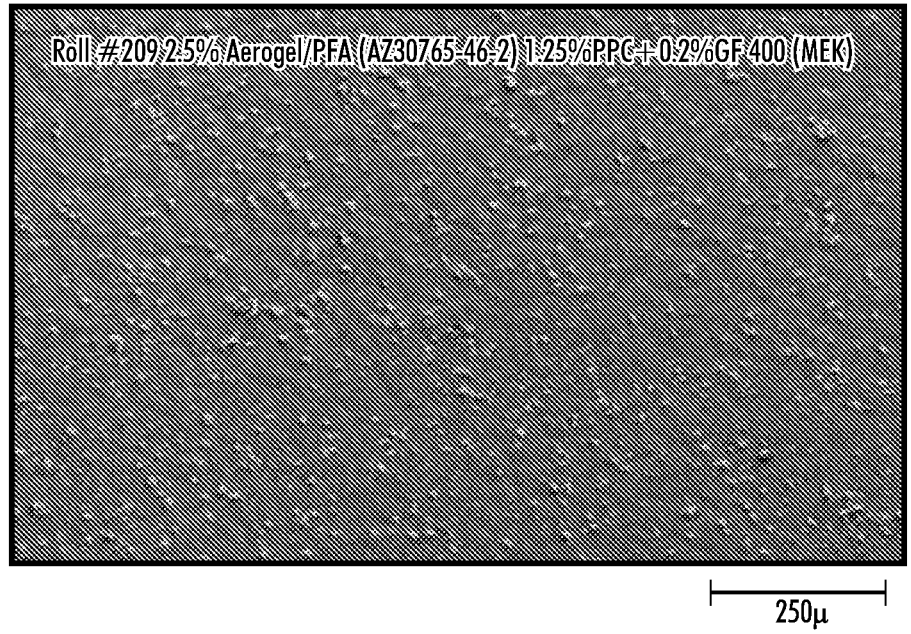
FIG. 5(a) shows an SEM image of a powder coating and fused topcoat of 2.5 weight percent aerogel particles, PFA particles, polypropylene carbonate.
Figure 5B:
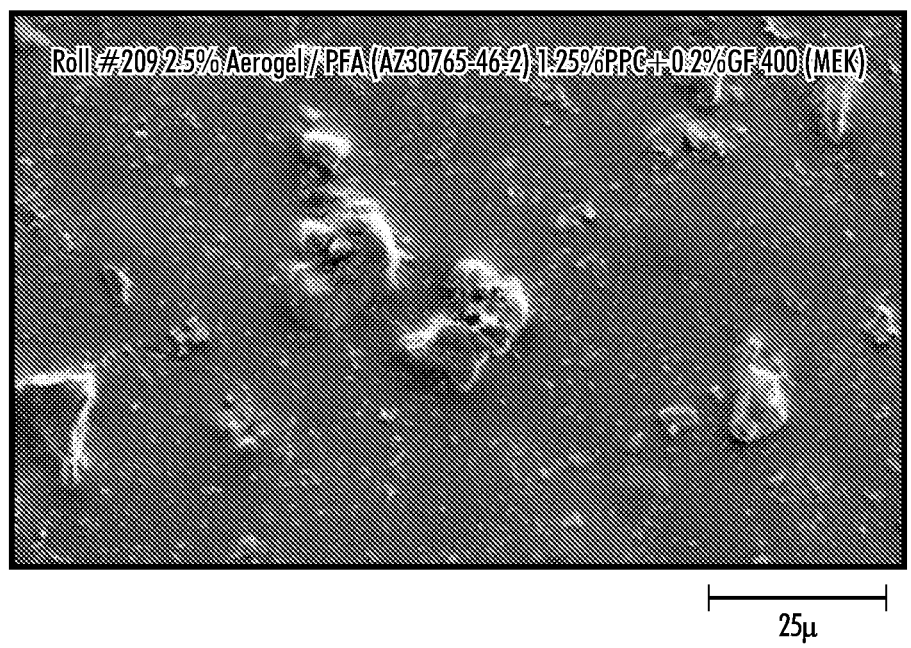
FIG. 5(b) shows an SEM image of a powder coating of 2.5 weight percent aerogel particles, PFA particles and polypropylene carbonate.

The cured 2.5% aerogel/PFA topcoat shows the uniform distribution of aerogel particles over the continuous PFA matrix without the voids (FIG. 5(a)). The aerogel particles also show a good wetting and leveling with PFA matrix. (FIG. 5(b)).

The print gloss on the uncoated paper (Color Xpressions Select 90 gsm) and coated paper (Digital Color Elite 120 gsm) obtained from the fuser rolls made from PFA powder mixture with 1 weight percent and 2.5 weight percent aerogel particles described in the Examples are lower than the control PFA fuser DC700. The gloss level can be controlled by adjusting the loading of aerogel particles.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims

What is claimed is:
1. A method of making a fuser member, comprising:
obtaining a fuser member comprising a resilient layer disposed on a substrate;
spray coating a powder comprising a composition of fluorine containing particles, aerogel particles and poly(alkylene carbonate) on the resilient layer to form a coated layer;
heating the coated layer to a temperature of from about 300° C. to about 380° C. wherein the poly(alkylene carbonate) decomposes and a release layer is formed.

2. The method of claim 1 wherein the fluorine containing particles comprise a material selected from the group consisting polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; tetrapolymers of tetrafluoroethylene, vinylidene fluoride, and hexafluoropropylene, and mixtures thereof.

3. The method of claim 1, wherein the poly(alkylene carbonate) comprises poly(propylene carbonate), poly(ethylene carbonate), poly(butylene carbonate), poly(cyclohexene carbonate) or mixtures thereof.

4. The method of claim 1, wherein the poly(alkylene carbonate) has a molecular weight (Mw) ranging from about 10,000 to about 800,000.

5. The method of claim 1, wherein the poly(alkylene carbonate) has a decomposition temperature ranging from about 200° C. to about 340° C.

6. The method of claim 1 wherein the composition further comprises fillers selected from the group consisting of carbon blacks, carbon nanotubes, graphite, graphene, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, ammonium or phosphonium salts, and mixtures thereof.

7. The method of claim 1, wherein the release layer comprises a thickness of from about 5 microns to about 250 microns.

8. The method of claim 1 wherein the resilient layer comprises a material selected from the group consisting of silicone rubbers, high temperature vulcanization silicone rubbers, low temperature vulcanization silicone rubbers, liquid silicone rubbers and siloxanes.

9. The method of claim 1, wherein the aerogel particles comprise a material selected from the group consisting of silica, carbon, alumina, titania and zirconia.

10. The method of claim 1, wherein the aerogel particles comprises a surface area of from about 400 $m^2/g$ to about 1200 $m^2/g$.

11. The method of claim 1, wherein the aerogel particles comprise a particle size of from about 1 µm to about 100 µm.

* * * * *